(12) United States Patent
Brandt et al.

(10) Patent No.: US 12,203,569 B2
(45) Date of Patent: Jan. 21, 2025

(54) HOSE, SPECIFICALLY FOR REFRIGERANT APPLICATIONS

(71) Applicant: ContiTech MGW GmbH, Hann. Münden (DE)

(72) Inventors: Alexandra Brandt, Gotha (DE); Michael Sont, Horneburg (DE)

(73) Assignee: ContiTech Techno-Chemie GmbH, Karben (DE)

( * ) Notice: Subject to any disclaimer, the term of this patent is extended or adjusted under 35 U.S.C. 154(b) by 0 days.

(21) Appl. No.: 17/754,642

(22) PCT Filed: Sep. 4, 2020

(86) PCT No.: PCT/EP2020/074821
§ 371 (c)(1),
(2) Date: Apr. 7, 2022

(87) PCT Pub. No.: WO2021/073804
PCT Pub. Date: Apr. 22, 2021

(65) Prior Publication Data
US 2024/0102585 A1    Mar. 28, 2024

(30) Foreign Application Priority Data

Oct. 14, 2019  (DE) .................... 10 2019 215 713.0

(51) Int. Cl.
| | |
|---|---|
| *F16L 11/08* | (2006.01) |
| *B29C 48/09* | (2019.01) |
| *B29C 48/154* | (2019.01) |
| *B29C 48/21* | (2019.01) |
| *F25B 41/40* | (2021.01) |

(Continued)

(52) U.S. Cl.
CPC .............. *F16L 11/08* (2013.01); *B29C 48/09* (2019.02); *B29C 48/154* (2019.02); *B29C 48/21* (2019.02);

(Continued)

(58) Field of Classification Search
CPC ......... F16L 11/00; F16L 11/081; F16L 11/085

(Continued)

(56) References Cited

U.S. PATENT DOCUMENTS

| 4,633,912 A | 1/1987 | Pilkington et al. |
| 5,488,974 A * | 2/1996 | Shiota .................... F16L 11/081 |
| | | 428/36.2 |

(Continued)

FOREIGN PATENT DOCUMENTS

| CN | 109340473 A | 2/2019 |
| EP | 0203880 A2 | 12/1986 |

(Continued)

OTHER PUBLICATIONS

Chinese Office Action dated Sep. 1, 2023 corresponding to Chinese Patent Application No. 202080071947.5.

(Continued)

*Primary Examiner* — Patrick F Brinson
(74) *Attorney, Agent, or Firm* — Gregory Adams; Richard A. Wolf

(57) ABSTRACT

A hose which has at least the following plies in the following order: an innermost layer (A4) which is based on thermoplastic material or thermoplastic elastomer material; an internal layer (A5) which is applied to the innermost layer (A4) and which is based on elastomer material; at least one reinforcing element ply (B, B1, B2), wherein the reinforcing element is arranged at an angle smaller than the neutral angle of 54.7°, and possibly an external layer (C) which is based on polymer material. The hose is suitable in particular as a pressure carrier hose for refrigerant lines, in particular for $CO_2$, for use as a pressure carrier of corrugated pipes.

13 Claims, 2 Drawing Sheets

Figure 1:
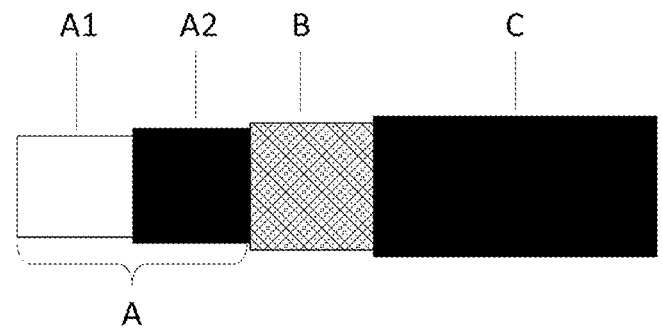

(51) Int. Cl.

| | |
|---|---|
| *B29K 21/00* | (2006.01) |
| *B29K 67/00* | (2006.01) |
| *B29K 77/00* | (2006.01) |
| *B29K 83/00* | (2006.01) |
| *B29K 105/06* | (2006.01) |
| *B29K 305/00* | (2006.01) |
| *B29L 23/00* | (2006.01) |
| *F16L 11/04* | (2006.01) |

(52) U.S. Cl.
CPC .......... *F16L 11/082* (2013.01); *F16L 11/086* (2013.01); *F25B 41/40* (2021.01); *B29K 2021/003* (2013.01); *B29K 2067/00* (2013.01); *B29K 2077/00* (2013.01); *B29K 2083/00* (2013.01); *B29K 2105/06* (2013.01); *B29K 2305/00* (2013.01); *B29L 2023/005* (2013.01); *F16L 2011/047* (2013.01)

(58) Field of Classification Search
USPC ................ 138/123–126, 137, 140, 141, 153
See application file for complete search history.

(56) References Cited

U.S. PATENT DOCUMENTS

| | | | | |
|---|---|---|---|---|
| 6,376,036 | B1* | 4/2002 | Nadkarni | ................. B32B 1/08 428/474.9 |
| 2002/0100516 | A1* | 8/2002 | Powell | ................... D04C 1/02 138/125 |
| 2004/0040607 | A1* | 3/2004 | Wilson | .................. F16L 11/085 138/140 |
| 2005/0199309 | A1* | 9/2005 | Kamiyama | ........... F16L 11/088 138/123 |
| 2005/0211325 | A1 | 9/2005 | Takagi et al. | |
| 2010/0229994 | A1 | 9/2010 | Wildermuth et al. | |
| 2011/0226375 | A1 | 9/2011 | Harris et al. | |
| 2014/0116562 | A1* | 5/2014 | Haines | .................... B32B 25/18 138/126 |
| 2015/0075666 | A1 | 3/2015 | Clark et al. | |

FOREIGN PATENT DOCUMENTS

| | | |
|---|---|---|
| WO | 2009043672 A2 | 4/2009 |
| WO | 2015039012 A1 | 3/2015 |

OTHER PUBLICATIONS

International Search Report dated Dec. 16, 2020 of International Application PCT/EP2020/074821 on which this application is based.
European Examination Report dated Jun. 4, 2024 corresponding to European Patent Application No. 10 2019 215 713.0.
Chinese Office Action dated Apr. 27, 2024 corresponding to Chinese Patent Application No. 202080071947.5.
CN Decision of Rejection dated Oct. 29, 2024 of counterpart CN application number.

* cited by examiner

HOSE, SPECIFICALLY FOR REFRIGERANT APPLICATIONS

The invention relates to a hose, in particular for refrigerant applications. The hose is particularly suitable as a pressure carrier hose for refrigerant lines, in particular for $CO_2$, for use as a pressure carrier of corrugated pipes.

Refrigerant hoses which are installed in air-conditioning systems for the automotive industry generally contain fluorocarbons as refrigerant. When it escapes into the atmosphere, this type of refrigerant has an adverse effect on the environment, e.g. in the form of acid rain or the greenhouse effect. $CO_2$ is a more environmentally friendly refrigerant. However, because of its molecular size and its physical-chemical properties, it places new requirements and demands on the air-conditioning system which have to be met or solved, inter alia, by new hose systems.

Hoses used for the conventional refrigerants usually consist of three different layers: an inner layer, a reinforcing element layer and an outer layer, wherein the outer layer and the inner layer are usually based on an elastomer material and the inner layer frequently has a multi-ply form and additionally has an integrated ply of a thermoplastic material that considerably improves the barrier property of the hose in terms of refrigerant loss, but at the same time worsens the flexibility of the hose.

It is possible to use, inter alia, EPDM, EPM, BIMS, BIIR, CIIR, IIR, CM, AEM, ACM, CR, NBR, HNBR, individually or in combination, as elastomers for the inner layer and/or the outer layer. The reinforcing element layer usually consists of organic fiber systems, e.g. polyester yarn, polyamide yarn, rayon yarn, aramid yarn or PVOH yarn, and is generally present in woven or spiralized, i.e. wound, form.

Figure 2:
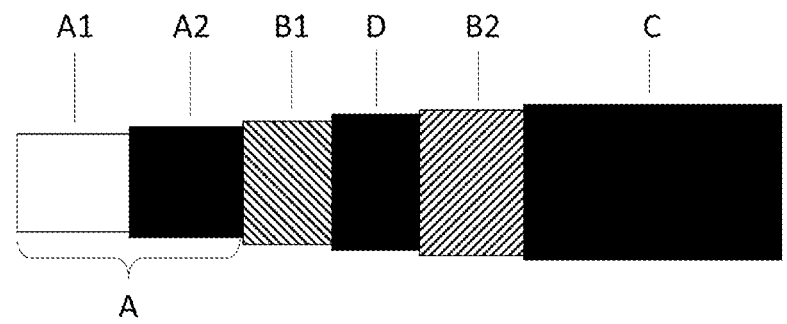
Figure 3:
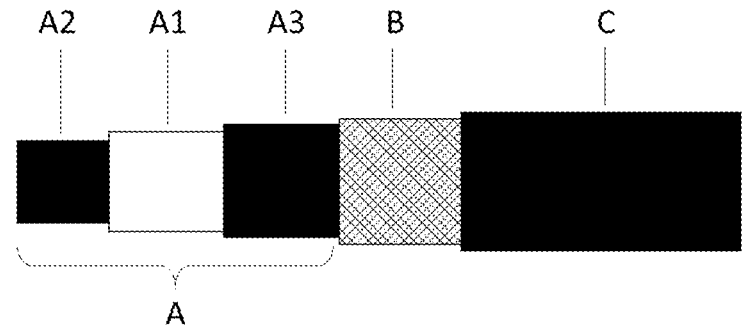
Figure 4:
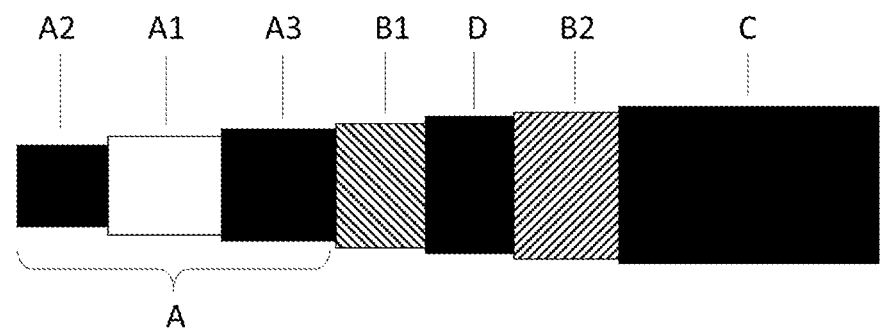

The thermoplastic ply of the inner layer may be either inside the hose (veneer hose: see FIGS. 1 and 2) or embedded, in the form of a barrier ply, between two further plies of the inner layer (barrier hose: see FIGS. 3 and 4). Polyamides have proven successful as material for the barrier ply. Nowadays, for the production of air-conditioning hoses, use is made in particular of impact-modified PA.6 types on account of their good compromise between flexibility and barrier function.

As already mentioned above, the hose structure stated must be redesigned for use with $CO_2$ as the refrigerant. The high-pressure side in particular places increased demands on the refrigerant line and concomitantly on the hose systems due to peak temperatures of approx. 180° C. and pressures of around 90 bar.

The object of the present invention is to provide a suitable hose structure with the corresponding materials, which is designed to increase the inner diameter as a result of compression of the hose for the purposes of installing, as required, a corrugated pipe which ultimately provides the entire hose concept with the required flexibility and barrier function under corresponding temperature and pressure loading.

This object is achieved by a hose having at least the following plies in the following order:
an innermost layer A4 which is based on thermoplastic material or thermoplastic elastomer material,
an internal layer A5 which is applied to the innermost layer A4 and which is based on elastomer material,
at least one reinforcing element ply B or B1, B2, wherein the reinforcing element is arranged at an angle smaller than the neutral angle of 54.7°, and
possibly an external layer C which is based on polymer material.

The innermost layer A4 can also be referred to here as a film.

Surprisingly, it has been found that the innermost layer, in addition to the task of serving as an installation aid for integrating the corrugated pipe, gives the entire hose system, i.e. including the corrugated pipe, enough stability under impulse loading to maintain the function of the entire system in terms of tightness. At the same time, the material of the innermost layer can exhibit enough flexibility for no cracks to form when it is compressed and under mechanical loading, and also have the temperature requirements necessary not to lose the properties just mentioned in the long term.

The hose according to the invention is suitable in particular for use as a pressure carrier hose for refrigerant lines, in particular when $CO_2$ is the refrigerant. In this case, a corrugated pipe has been introduced into the hose according to the invention, through which the refrigerant is intended to flow.

Here, the expression "in the following order" refers to an order from the inside to the outside of the hose. In particular, the innermost layer generally forms the innermost ply of the hose.

The internal layer is applied to the innermost layer, i.e. the internal layer is in particular in direct proximity to or in contact with the innermost layer. The innermost layer and the internal layer together form the inner layer of the hose, which may if appropriate comprise one or more further layers between the internal layer and the reinforcing element ply, although this is not preferred.

According to the invention, the hose has an innermost layer as the innermost ply, which is based on thermoplastic material or thermoplastic elastomer material.

The thermoplastic material comprises or consists of one or more thermoplastics. The thermoplastic elastomer material comprises or consists of one or more thermoplastic elastomers. The thermoplastics or thermoplastic elastomers used are preferably flexible and heat-resistant. In addition to thermoplastic material or thermoplastic elastomer material, the innermost layer may if appropriate contain one or more additives, such as fillers or stabilizers, the total proportion of additives preferably being no more than 10% by weight, more preferably no more than 5% by weight, of the innermost layer. The innermost layer is in particular a thermoplastic layer or a thermoplastic and elastomer layer.

Thermoplastic copolyester elastomer (TPC) has proven to be a particularly suitable material for the innermost layer. In general or else for lower temperature applications, one or more of the following materials, inter alia, may be taken into consideration as thermoplastic material or thermoplastic elastomer material of the innermost layer: polypropylene (PP), polyethylene (PE), polymethylpentene (PMP), thermoplastic elastomer (TPE), polyamide, such as PA6, PA66, PA11, PA12, PA46, PA610, PA9T, PA6T, fluoropolymer or silicone polymer.

In a preferred embodiment, the thermoplastic material or thermoplastic elastomer material of the innermost layer therefore preferably contains or consists of at least one thermoplastic elastomer (TPE), polyamide, fluoropolymer, silicone polymer or a combination thereof, wherein TPE or polyamide is preferred. The polyamide is preferably polyolefin-modified polyamide or elastomer-modified polyamide. If the material contains or consists of TPE, it is in particular a thermoplastic elastomer material.

In a particularly preferred embodiment, the thermoplastic material or thermoplastic elastomer material of the innermost layer contains or consists of thermoplastic copolyester elastomer (TPC). In this case it is in particular a thermoplastic elastomer material. The TPC may be a bond-modified TPC, which is to be understood to mean a TPC that has been modified for the purpose of improved chemical bonding to an adjacent ply. Such a TPC modification may be effected by incorporating additional reactive groups into the TPC polymer. One example of a bond-modified TPC is a TPC grafted with maleic anhydride.

The innermost layer preferably has a wall thickness in the range of from 0.05 to 0.6 mm, more preferably from 0.08 to 0.15 mm, wherein a wall thickness of approx. 0.1 mm is particularly preferred.

The hose according to the invention also has an internal layer which is applied to the innermost layer and which is based on elastomer material. The elastomer material comprises or consists of one or more elastomers. In addition to elastomer material, the internal layer may if appropriate contain one or more additives, such as fillers or stabilizers, wherein the total proportion of additives can depend strongly on the type of mixture used. When AEM is used as elastomer material, the total proportion of additives may account, for example, for preferably no more than 60% by weight, more preferably no more than 50% by weight, of the internal layer. The internal layer is located between the innermost layer and the at least one reinforcing element. The internal layer is in particular an elastomer layer.

In a preferred embodiment, the elastomer material of the internal layer contains or consists of ethylene-acrylate rubber (AEM), acrylate rubber (ACM), fluoro rubber (FPM), ethylene-propylene-diene rubber (EPDM), ethylene-propylene rubber (EPM), hydrogenated acrylonitrile-butadiene rubber (HNBR), brominated copolymer of isobutylene and para-methylstyrene (BIMS), ethylene-vinyl acetate rubber (EVM), silicone rubber (VMQ) or blends thereof or blends with other elastomers. The elastomer material particularly preferably contains or consists of AEM, in particular AEM crosslinked by diamines. The internal layer is preferably present in extruded form.

The internal layer preferably has a thickness in the range of from 0.5 to 2.5 mm, more preferably from 1 to 1.5 mm.

The hose according to the invention additionally contains one, two or more reinforcing element plies, wherein one or two reinforcing element plies are preferred. The reinforcing element(s) in the reinforcing element ply or plies is/are arranged at an angle smaller than the neutral angle of 54.7°, wherein the angle is preferably in the range of from 15 to 53.6°, preferably from 30 to 37°, in particular is approx. 34 to 35°.

A person skilled in the art knows that this angle of the reinforcing element relates to the acute angle produced between the thread orientation of the reinforcing element and the longitudinal axis of the hose. The neutral angle (54.7°) of the reinforcing element is the angle at which the hose remains dimensionally stable under compressive loading. At an angle smaller than the neutral angle, the hose diameter increases under compressive loading, whereas at an angle larger than the neutral angle, the hose diameter decreases under compressive loading.

The reinforcing element is customarily in the form of thread, yarn, fiber, cord or wire. The reinforcing element ply is generally applied, preferably to the internal layer, by weaving or spiralizing (coiling) the reinforcing element. The reinforcing element is therefore preferably present in woven or spiralized, i.e. wound, form.

Preferably suitable as material for the reinforcing element is metal wire, aramid, e.g. p-aramid or m-aramid, polyamide, polyethylene terephthalate (PET) or polyvinyl alcohol (PVOH) or combinations of the aforesaid in the form of hybrid systems, wherein the non-metallic reinforcing element is preferably yarn, threads or fibers. The reinforcing element is preferably formed from metal wire, wherein steel wire is particularly preferred.

In the case of woven reinforcing element plies, one or two, preferably one, reinforcing element plies may be arranged. In the case of spiralized reinforcing element plies, one or two, preferably two, reinforcing element plies may be arranged. In the case of spiralized reinforcing element plies, use is generally made of two reinforcing element plies, which may be identical or differ from one another.

If the at least one reinforcing element ply comprises or is two reinforcing element plies, an intermediate layer, which is preferably based on elastomer material, is preferably located between the two reinforcing element plies, wherein the two reinforcing element plies are preferably spiralized or wound reinforcing element plies.

The intermediate layer is preferably based on elastomer material. The elastomer material comprises or consists of one or more elastomers. The intermediate layer may if appropriate contain one or more additives, such as fillers or stabilizers. The intermediate layer preferably has a thickness in the range of from 0.1 to 0.2 mm. The optional intermediate layer is therefore in particular an elastomer layer.

In a preferred embodiment, the elastomer material of the intermediate layer advantageously contains or consists of AEM, ACM, FPM, EPDM, EPM, HNBR, BIMS, EVM, VMQ or combinations thereof. The elastomer material particularly preferably contains or consists of AEM, in particular AEM crosslinked by diamines. The intermediate layer is preferably present in extruded form.

The hose according to the invention possibly has an external layer or outer layer which is based on polymer material. An external layer based on polymer material is preferably present. The polymer material may be, for example, thermoplastic material, thermoplastic elastomer material or elastomer material, preferably elastomer material.

The polymer material, preferably elastomer material, of the optional external layer comprises or consists of one or more polymers, preferably elastomers. The external layer may if appropriate contain one or more additives, such as fillers or stabilizers, wherein the total proportion of additives can depend strongly on the type of mixture used. When AEM is used as elastomer material, the total proportion of additives may account, for example, for preferably no more than 60% by weight, more preferably no more than 50% by weight, of the external layer. The optional and preferred external layer is in particular an elastomer layer.

In a preferred embodiment, the elastomer material of the external layer contains or consists of AEM, ACM, FPM, EPDM, EPM, HNBR, BIMS, EVM, VMQ or blends thereof or blends with other elastomers. The elastomer material particularly preferably contains or consists of AEM, in particular AEM crosslinked by diamines. The external layer is preferably present in extruded form.

The external layer, if it is used, preferably has a thickness in the range of from 0.1 to 2.5 mm, more preferably from 1 to 1.8 mm.

There is preferably a sufficiently strong adhesive bond between all of the plies, which is improved if appropriate by integrating thin adhesion-promoter layers between the plies or layers. In order to generate or optimize the adhesion between the various plies, additional adhesion-promoter layers may therefore be added to the hose structure if appropriate.

In addition to the innermost layer, the internal layer, the at least one reinforcing element and the optional plies described above (intermediate layer, external layer, adhesion-promoter layer), it is possible for further layers to be present if appropriate, although this is not preferred.

In particularly preferred embodiments, the hose according to the invention has the following structure, wherein the reinforcing element ply or plies is/are preferably formed from metal wire, in particular steel wire, and/or wherein one or more adhesion-promoter layers are added to the hose structure if appropriate:

TPC film (innermost layer)/internal AEM layer/woven reinforcing element ply/external AEM layer or TPC film (innermost layer)/internal AEM layer/spiralized reinforcing element ply/AEM intermediate layer/AEM intermediate layer/spiralized reinforcing element ply/external AEM layer As mentioned, the hose according to the invention is suitable in particular as a pressure carrier hose for coolant lines. In this respect, a corrugated pipe is preferably used as coolant line. In the preferred usage situation, a corrugated pipe is therefore arranged inside the hose. Corrugated pipes are known to those skilled in the art. A corrugated pipe is generally a pipe of rigid material having a diameter which varies in a corrugated shape, the corrugation giving the pipe flexibility. The corrugated pipe may be formed from metal or plastic, for example, metal being preferred because in the case of $CO_2$ plastic is suitable only at relatively low temperatures and pressures.

The invention also relates to a method for producing a hose according to the invention and as described above, comprising the following steps:

applying a material containing thermoplastic material or thermoplastic elastomer material to a mandrel, preferably by extrusion, to form the innermost layer (A4), applying a material containing elastomer material to the innermost layer, preferably by extrusion, to form the internal layer on the innermost layer, applying the at least one reinforcing element ply over the internal layer (A5) by weaving or spiralizing, wherein the reinforcing element is arranged at an angle smaller than the neutral angle of 54.7°, and optionally applying a material containing polymer material, preferably elastomer material, over the at least one reinforcing element ply, preferably by extrusion, to form the external layer (C).

The innermost layer, the internal layer and/or, if present, the intermediate layer and/or the external layer of the hose, preferably the refrigerant hose, are preferably extruded onto a mandrel one after the other. The hose is then vulcanized and removed from the mandrel.

The hose according to the invention is then available for installing a corrugated pipe. For this, firstly the hose is preferably cut to the desired length. The hose or hose blank may then be compressed, which results in an increase of the inner diameter, which allows the corrugated pipe to be pushed in.

The invention also relates to the use of a hose according to the invention as described above as a pressure carrier hose for refrigerant lines, in particular when $CO_2$ is the refrigerant. The hose is suitable in particular for use at an operating temperature of 160° C. or more, in particular with the material selection described above.

The invention will now be explained in more detail on the basis of exemplary embodiments with reference to experimental results and schematic drawings. However, the invention is not limited to the exemplary embodiments below.

SCHEMATIC DRAWINGS

FIG. 1 shows a refrigerant hose in the form of a veneer hose from the prior art having a woven reinforcing element ply B, having a two-ply structure of the inner layer A, in which the thermoplastic ply A1 of the inner layer A consists of polyamide and, in the form of a barrier ply, forms the innermost ply of the inner layer A, having a further second ply A2 of the inner layer A, and having an external layer C.

FIG. 2 shows a refrigerant hose in the form of a veneer hose from the prior art having two spiralized reinforcing element plies B1, B2, having a two-ply structure of the inner layer A, in which the thermoplastic ply A1 of the inner layer A consists of polyamide and, in the form of a barrier ply, forms the innermost ply of the inner layer A, having a further second ply A2 of the inner layer A, having an additional elastomer intermediate layer D, and having an external layer C.

FIG. 3 shows a refrigerant hose in the form of a barrier hose from the prior art having a woven reinforcing element ply B, having a three-ply structure of the inner layer A, in which the thermoplastic ply A1 of the inner layer of polyamide is embedded in the form of a barrier ply between two further plies A2, A3 of the inner layer A, having a further second ply A2 of the inner layer A, having an additional third ply A3 of the inner layer A, and having an external layer C.

FIG. 4 shows a refrigerant hose in the form of a barrier hose from the prior art having two spiralized reinforcing element plies B1, B2, having a three-ply structure of the inner layer A, in which the thermoplastic ply A1 of the inner layer A of polyamide is embedded in the form of a barrier ply between two further plies A2, A3 of the inner layer A, having a further second ply A2 of the inner layer A, having an additional third ply A3 of the inner layer A, having an additional elastomer intermediate layer D, and having an external layer C.

Figure 5:
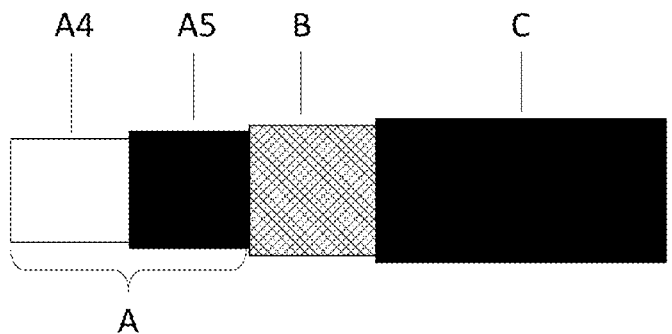

FIG. 5 shows a hose according to the invention having a woven reinforcing element ply B, having a two-ply structure of the inner layer A, in which the first ply, in the form of an innermost layer (film) A4 of the inner layer A, is based on a thermoplastic material or thermoplastic elastomer and the second ply (the internal layer) A5 of the inner layer A is based on an elastomer material. The external layer C is optional and is likewise polymeric.

Figure 6:
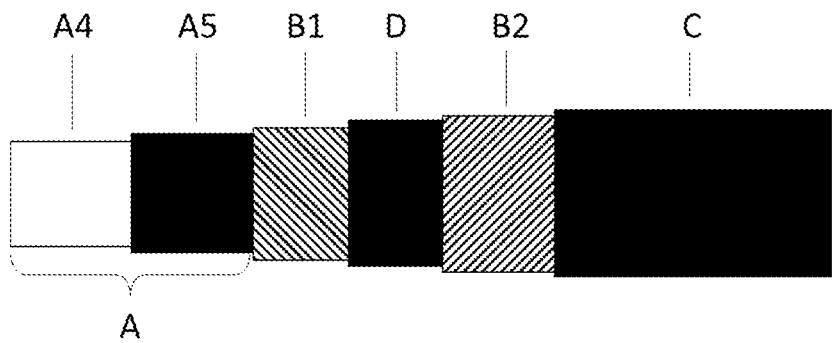

FIG. 6 shows a hose according to the invention having two spiralized reinforcing element plies B1 and B2, having a two-ply structure of the inner layer A, in which the first ply, in the form of an innermost layer A4 of the inner layer A, is based on a thermoplastic material or thermoplastic elastomer and the second ply A5 of the inner layer A is based on an elastomer material, having an additional optional intermediate layer D, and having an optional external layer C.

Figure 7:
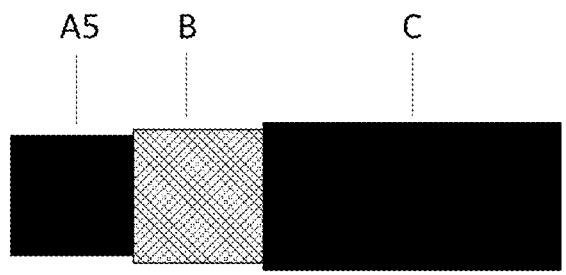

FIG. 7 shows a hose, not according to the invention, for comparison purposes, having a woven reinforcing element ply B, and just one internal ply or layer A5 which is based on an elastomer material. The external layer C is again optional and is likewise polymeric. The hose does not have an internal layer A4 based on a thermoplastic material or thermoplastic elastomer.

EXAMPLES

A hose (C1) without an innermost layer and multiple hoses (I1, I2 and I3) according to the invention were produced. In this respect, the hose structure of the hoses was as follows (the internal layer, the reinforcing element and the external ply are the same in all of the examples):

Innermost layer A4 (film): TPC (Arnitel CM622 from DSM), ply thickness 0.06 mm (I3); TPC (Arnitel CM622 from DSM), ply thickness 0.1 mm (I2); polyamide PA6 (Orgalloy LT5050 from Arkema), ply thickness 0.1 mm (I1); no internal ply A4 (C1)

Internal layer A5: AEM, ply thickness 1.3 mm

Reinforcing element layer B: Steel wire, woven, weave angle 34°

External layer C: AEM, ply thickness 1.4 mm

Experimental Results

Table 1 shows various physical test results on the basis of the hose produced without the innermost layer C1 and the hoses I1, I2 and I3 according to the invention that were produced. Before the function tests, the hoses were respectively installed on a corrugated pipe of the same nature.

The test results were ascertained in accordance with DIN Spec 74106. The evaluation "+" means that the test was passed; the evaluation "−" means that the test was not passed; the evaluation "+/−" means that the test was partially passed.

TABLE 1

|  | C1 | I1 | I2 | I3 |  |
|---|---|---|---|---|---|
| Impulse testing | − | + | + | +/− | 0 to 165° C./50 to 170 bar/150 000 cycles/DIN Spec 74106 |
| Heat resistance innermost layer | − | + | + | + | 1000 h/165° C./DIN 53508 - 6.2 168 h/180° C./DIN 53508 - 6.2 |
| Heat resistance AEM | + | + | + | + | 1000 h/165° C./DIN 53508 - 6.2 168 h/180° C./DIN 53508 - 6.2 | as a pressure carrier hose for use in the high-temperature range (at present, temporarily at most 180° C.) and with $CO_2$ as the refrigerant. It is distinguished by sufficiently good heat resistance and good cold flexibility. In addition, the hose in combination with the corrugated pipe has good impulse behavior. The hoses I1 and I3 according to the invention have limited suitability for use as a pressure carrier hose in the high-temperature range.

The comparative hose C1 without the innermost layer fails even after a brief impulse output and the corrugated pipe is more difficult to install. In the case of the hoses I1, I2 and I3 according to the invention, the installation of the corrugated pipe is easier.

LIST OF REFERENCE SIGNS

Part of the Description

A Inner layer
A1 Barrier ply of the inner layer
A2 Further second ply of the inner layer
A3 Additional third ply of the inner layer
A4 Innermost layer
A5 Elastomer layer (inner layer)
B Single reinforcing element ply
B1 First reinforcing element ply
B2 Second reinforcing element ply
D Elastomer intermediate layer
C External layer

The invention claimed is:

1. A pressure carrier hose for refrigerant lines comprising at least the following plies in the following order:
an innermost layer (A4) which is based on a thermoplastic material or a thermoplastic elastomer material;
an internal layer (A5) which is applied to the innermost layer (A4) and which is based on a second elastomer material;
at least one reinforcing element ply (B, B1, B2), wherein the reinforcing element is arranged at an angle smaller than a neutral angle of 54.7°;
an optional external layer (C) which is based on a polymer material;
wherein the thermoplastic material or the thermoplastic elastomer material of the innermost layer (A4) comprises a bond-modified thermoplastic copolyester elastomer (TPC); and is selected from at least one member of the group consisting of thermoplastic elastomer (TPE), polyamide, fluoropolymer, silicone polymer and a combination thereof; and
wherein the polyamide is an elastomer-modified polyamide.

2. The pressure carrier hose as claimed in claim 1, wherein the thermoplastic material or the thermoplastic elastomer material of the innermost layer (A4) consists of thermoplastic elastomer (TPE).

3. The pressure carrier hose as claimed in claim 1, wherein the innermost layer (A4) has a wall thickness in the range of from 0.05 to 0.6 mm.

4. The pressure carrier hose as claimed in claim 3, wherein the innermost layer (A4) has a wall thickness in the range of from 0.08 to 0.15 mm.

5. A pressure carrier hose for refrigerant lines comprising at least the following plies in the following order:
an innermost layer (A4) which is based on a thermoplastic material or a thermoplastic elastomer material;
an internal layer (A5) which is applied to the innermost layer (A4) and which is based on a second elastomer material;
at least one reinforcing element ply (B, B1, B2), wherein the reinforcing element is arranged at an angle smaller than a neutral angle of 54.7°;
an optional external layer (C) which is based on a polymer material; and
wherein the at least one reinforcing element ply comprises two reinforcing element plies (B1, B2), and wherein an intermediate layer (D) based on a third elastomer material is located between each of the two reinforcing element plies (B1, B2).

6. The pressure carrier hose as claimed in claim 5, wherein the polymer material of the external layer @ is present and formed of a fourth elastomer material, and wherein the third elastomer material and the fourth elastomer material, independently of one another, are selected from the group consisting of ethylene-acrylate rubber (AEM), acrylate rubber (ACM), fluoro rubber (FPM), ethylene-propylene-diene rubber (EPDM), ethylene-propylene rubber (EPM), hydrogenated acrylonitrile-butadiene rubber (HNBR), brominated copolymer of isobutylene and para-methylstyrene (BIMS), ethylene-vinyl acetate rubber (EVM), silicone rubber (VMQ) or any combination thereof.

7. The pressure carrier hose as claimed in claim 6, wherein the third elastomer material and the fourth elastomer material are both ethylene-acrylate rubber (AEM).

8. The pressure carrier hose as claimed in claim 7, wherein the ethylene-acrylate rubber (AEM) is crosslinked by diamines.

9. The pressure carrier hose as claimed in claim 1, wherein the reinforcing element is formed from metal wire.

10. The pressure carrier hose as claimed in claim 1, wherein the reinforcing element is present in woven or spiralized form.

11. The pressure carrier hose as claimed in claim 1, wherein the reinforcing element is arranged at an angle in the range of from 15 to 53.6°.

12. The pressure carrier hose as claimed in claim 11, wherein the reinforcing element is arranged at an angle in the range of from 30 to 37°.

13. The pressure carrier hose as claimed in claim 1, wherein a corrugated pipe is arranged inside the hose, and wherein $CO_2$ refrigerant at a temperature of 160° C. flows through the corrugated pipe.

* * * * *